Dec. 10, 1935.   G. WILLIMEK   2,023,717
ELECTRIC BATTERY CELL
Filed July 15, 1933
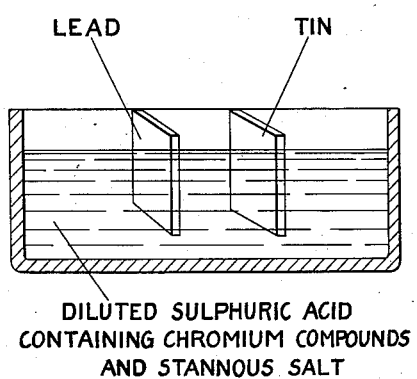
LEAD   TIN
DILUTED SULPHURIC ACID
CONTAINING CHROMIUM COMPOUNDS
AND STANNOUS SALT
G. Willimek
INVENTOR
By: Marks & Clerk, Attys.

Patented Dec. 10, 1935

2,023,717

UNITED STATES PATENT OFFICE 2,023,717

ELECTRIC BATTERY CELL

Gustaw Willimek, Warsaw, Poland

Application July 15, 1933, Serial No. 680,639
In Germany July 23, 1932

10 Claims. (Cl. 136—20)

This invention relates to a galvanic element or an electric accumulator in which the anode consists of lead or of oxygen compounds of lead, the cathode of tin or of tin with addition of other metals, either in the form of an alloy or a highly compressed mixture of the finely powdered metals, and the electrolyte of diluted sulphuric acid with addition of any chromium compounds and stannous sulphate ($SnSO_4$).

Anodes of lead or of oxygen compounds of lead, as well as kathodes of tin, have long been known; similarly it is also known to add chromium compounds to electrolytes of diluted sulphuric acid.

It is new, however, to use an electrolyte of diluted sulphuric acid with small quantities of chromium compounds and stannous salt admixed therewith as well as cathodes of tin admixed with other metals. Finally galvanic elements or accumulators are new in which the anode consists of lead or oxygen compounds of lead, and the cathode of tin, if necessary, with an addition of other metals, and the electrolyte of diluted sulphuric acid in which not more than 4 gms. per litre of chromium compound and not more than 80 gms. per litre of stannous salt, preferably stannous sulphate are dissolved. Galvanic elements of 2 to 2.2 volts and a discharge of 100 amps. or more per 1 $dm^2$ cathode surface on short circuit were hitherto unknown; these properties, however, are possessed by the element provided by this invention. Furthermore, the galvanic element according to the invention is also to be considered as an accumulator since it can be charged.

During the charge and discharge the following chemical reactions between the anode and the tin salt of the electrolyte take place:

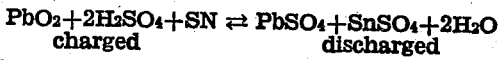

or $Pb_2O_5 + H_2SO_4 + Sn \rightleftarrows 2PbO_2 + SnSO_4 + H_2O$.

The object of adding stannous salt to the electrolyte is to produce a porous surface on the cathode by the deposition of tin, whereby the charging is facilitated. The tin separates out in a finely powdered form which causes firm adhesion of the metal to the cathode. The use of larger quantities of stannous salt is injurious, since the excess of tin salt forms a mud in the electrolyte which may give rise to short circuiting and furthermore raises the resistance of the electrolyte. The addition of chromium compounds in the small quantities mentioned prevents the formation of injurious sulphates on the surfaces of the electrodes and its catalytic effect favourably influences the oxidation of the electrodes during charging. In addition the presence of a chromium salt in the electrolyte practically completely excludes the possibility of spontaneous discharge notwithstanding the fact that a cathode of tin or of tin mixed with other metals which are difficulty soluble in diluted sulphuric acid is used, since such cathodes already make a spontaneous discharge very difficult. Finally an element of the kind provided can be charged with a much heavier current than was hitherto possible. By employing a cathode of tin and more particularly of tin to which other metals have been added, the initial polarization of the element is diminished owing to the fact that an alloy or an amalgam of tin and hydrogen is formed on the cathode with evolution of nascent hydrogen; this is best proved by the fact that immediately after adding the electrolyte the voltmeter shows 2.1 volts and the ammeter some hundreds of amps., which demonstrates the presence of a minimum internal resistance. The element can also be charged by means of a heavy current after its electrical energy has been completely utilized; the polarization of the cathode then strongly rises, and this is very favourable for the utilization of the element as an accumulator.

The object of adding other metals is to increase the electrical conductivity, but, of course, this is dependent upon what metals are used and the ratio in which they are added to the tin. The addition of metals to tin in the form of an alloy diminishes the solubility of the tin of the cathode in the sulphuric acid and as a result increases the resistance of the cathode plate to the action of mechanical forces.

The following metals come into consideration for adding to tin in order to make cathode electrodes: magnesium, calcium, aluminium, zinc, silicon, lead, antimony, copper, bismuth, cadmium, silver, palladium. The addition to the tin of one metal or of several metals together is effected practically by making alloys or by compressing the mixture of finely powdered or even spongy tin and finely powdered additional metals under high pressure. The metals added to the tin must not exceed 20% of the resulting mixture or alloy. It is advisable, however, to employ still smaller quantities of the additional metals, particularly if one or two metals are being added to the tin. For example, the following compositions are suitable: 95% tin +5% lead; 95% tin +2% cadmium +3% silicon; 95% tin +2% calcium +3% antimony; 95% tin +2% lead +3% silicon; 90% tin +5% antimony +5% silicon. When using an addition of three or more metals the quantity of tin may be smaller but never less than 80%. Examples of suitable compositions are: 80% tin +5% copper +5% silicon +10% lead; 80% tin +2% lead +3% silver +5% aluminium +2% copper +3% magnesium +5% antimony.

The quantity of additional metal which is added to the tin preferably does not exceed 10% calculated with respect to the tin; it is advisable to keep the quantity of this additional metal within the limits of 1 to 10%.

It has been found that cathodes prepared from a mixture of metals have a much better electrical conductivity than those made from each individual metal alone.

The accompanying drawing shows schematically an example of an electric battery cell of the kind provided by this invention.

Example

A galvanic element or accumulator was made having the dimensions 160 x 50 x 60 mm. in which the anodes consisted of lead dioxide ($PbO_2$) and the cathodes of an alloy of 96% tin, 2% lead and 2% antimony. The electrolyte consisted of diluted sulphuric acid of 24° Bé. with an addition of 3 gms. of chromium sulphate and 1 gm. of sodium dichromate as well as 30 gm. of stannous sulphate per litre of diluted acid. After adding the electrolyte the voltmeter showed a P. D. of 2.1 volts and the ammeter read on short circuit 100 amperes per 1 $dm^2$ cathode surface. After one hour's rest the voltmeter indicated 2.1 volts and the ammeter read on short circuit about 800 amps. With a voltmeter in the circuit iron and copper wires of 1.2 to 1.5 mm. diameter were fused twenty times one after the other, the voltmeter indicating a fall in the tension to 1.8 to 1.7 volts. However, if between each fusion the circuit was left in a state of rest for two to three minutes then during each fusion the voltmeter indicated a tension of 2 volts. No discharge has taken place. After the fusion of the last wire the ammeter indicated about 500 amps. at 2 volts. After three hours' rest the ammeter showed about 570 amps. and the voltmeter 2 volts. Remarkable recuperative powers were possessed by the cell, therefore, as well as a high resistance to short circuiting.

The element or accumulator provided by this invention possesses several advantages. For example, the resistance of the electrolyte amounts to about 0.005 ohm and less and, therefore, is very small. The electric capacity for uninterrupted discharge therefore, is also comparatively small. On the other hand this is considerably greater than in the elements or accumulators hitherto known when the discharge is carried out interruptedly, owing to the high regeneration or recuperation. The electrical capacity of the element provided by the invention may, however, be enlarged as desired by addition of small quantities of colloidal substances to the electrolyte, which as is well known raises the resistance of the electrolyte by diminishing the conductivity of the same (c. f. Kohlrausch, "Das Leitvermögen der Elektrolyte", Leipzig, (Teubner) 1916, page 68).

Immediately after filling in the electrolyte a considerable electrical energy is available, which is of great importance, for example, for starting up automobiles as well as for telegraphic purposes. Finally, short circuiting is also possible, a regeneration occurring almost immediately.

What I claim is:

1. An electric battery cell having an anode of lead dioxide, a kathode consisting of an alloy of 96% tin, 2% lead and 2% antimony, and an electrolyte consisting of sulphuric acid of density 24° Bé. to each litre of which has been added 3 gms. of chromium sulphate, 1 gm. of sodium dichromate and 30 gms. of stannous sulphate.

2. An electric battery cell having an anode of a substance selected from lead and oxides of lead, a kathode comprising metallic tin, and an aqueous electrolyte containing sulphuric acid together with up to 4 gms. per litre of dissolved chromium compounds and up to 80 gms. per litre of dissolved stannous salt.

3. An electric battery cell having an anode of a substance selected from lead and oxides of lead, a kathode consisting of metallic tin together with not more than 20% of at least one element selected from the following group of elements: magnesium, calcium, aluminium, zinc, silicon, lead, antimony, copper, bismuth, cadmium, silver, and palladium, and an aqueous electrolyte containing sulphuric acid together with up to 4 gms. per litre of dissolved chromium compounds and up to 80 gms. per litre of dissolved stannous salt.

4. An electric battery cell as claimed in claim 3 in which the elements comprising the kathode are in the form of an alloy.

5. An electric battery cell as claimed in claim 3 in which the elements comprising the kathode are in the form of a compressed finely powdered mixture.

6. An electric battery cell as claimed in claim 3 in which the kathode consists of a compressed mixture of finely powdered tin to the extent of 80-98% and, to the extent of 20-2%, of finely powdered alloy of at least two elements selected from the following group of elements: magnesium, calcium, aluminium, zinc, silicon, lead, antimony, copper, bismuth, cadmium, silver and palladium.

7. An electric battery cell as claimed in claim 3 in which the electrolyte contains at least one of the compounds chromium sulphate and sodium dichromate.

8. An electric battery cell as claimed in claim 2 in which the electrolyte contains at least one of the compounds chromium sulphate and sodium dichromate.

9. An electric battery cell as claimed in claim 2 in which stannous sulphate is the stannous salt.

10. An electric battery cell as claimed in claim 3 in which stannous sulphate is the stannous salt.

GUSTAW WILLIMEK.